Patented Jan. 30, 1923.

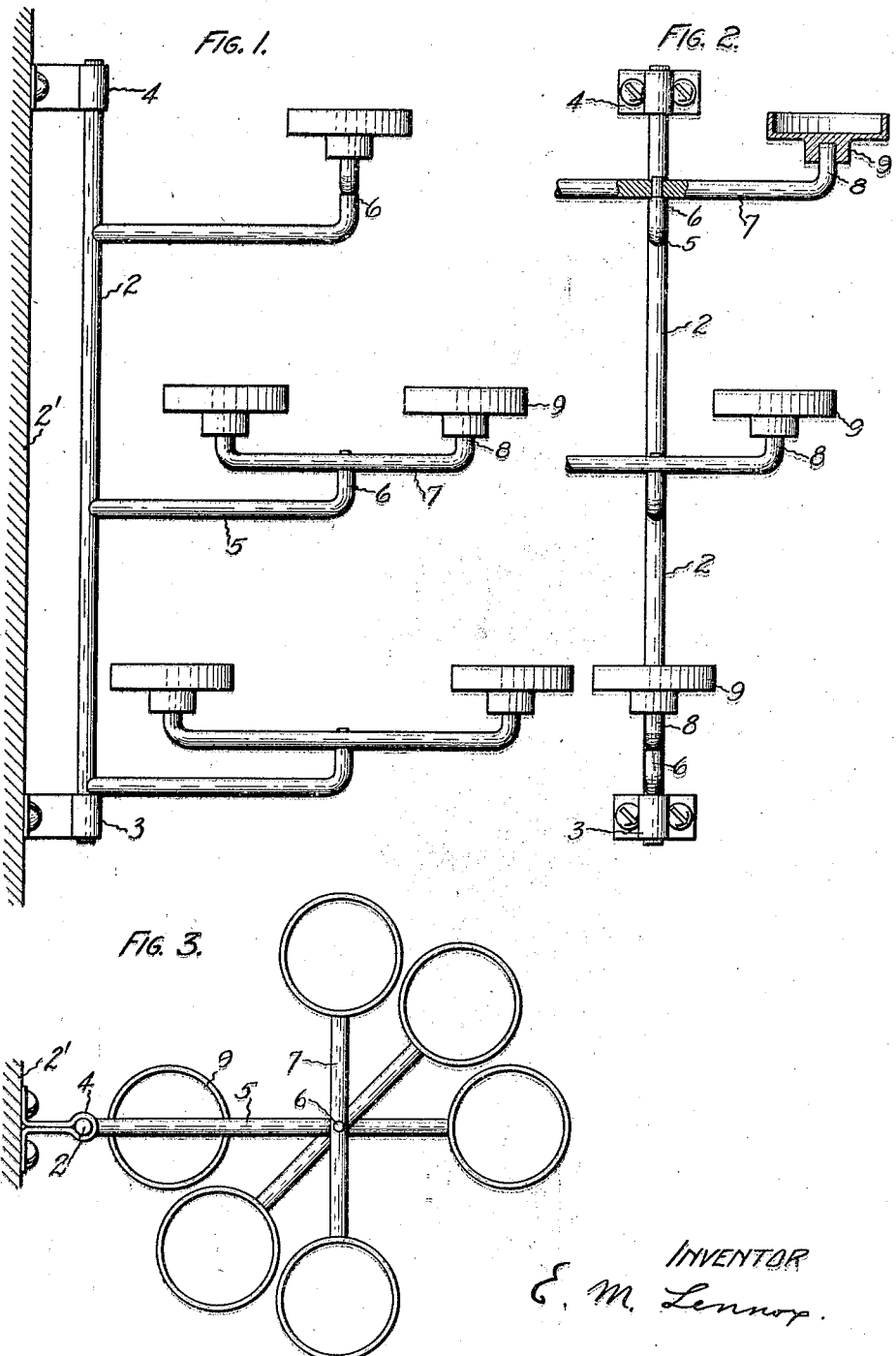

1,443,420

UNITED STATES PATENT OFFICE.

EVA M. LENNOX, OF ELBERON, NEW JERSEY.

FLOWER HOLDER.

Application filed September 1, 1922. Serial No. 585,666.

*To all whom it may concern:*

Be it known that EVA M. LENNOX, citizen of the United States, residing at Elberon, in the county of Monmouth and State of New Jersey, has invented certain new and useful Improvements in Flower Holders, of which the following is a specification.

This invention relates to what might be broadly considered a flower holder and while it is capable of general application, it is of a special importance when used for certain growing plants such as rambler roses, being intended to sustain concurrently several of the growing plants so that they can be trained about the structure as may be desired.

In the drawing accompanying and forming part of the present specification, I have shown in detail one of the several forms of embodiment of the invention which to enable those skilled in the art to practice the same will be set forth fully in the following description. Obviously, I am not restricted to such disclosure. I may depart therefrom in several respects within the scope of the invention defined by the claims following said description.

Referring to said drawing:

Fig. 1 is a side elevation of a flower holder involving the invention.

Fig. 2 is a front view showing the rods in different positions.

Fig. 3 is a top plan view of the structure with the rods in positions corresponding to Figs. 1 and 2.

Like characters refer to like parts throughout the several views.

The device involves in its make-up a standard or upright as 2 and which may for example be made from a proper length of metal or other rod, ornamented or otherwise as is dictated by particular fancy. At the lower end, the standard or upright is mounted in a bearing as 3, the upper end of the standard or upright being fitted in a crown-piece 4. This crown-piece and the complemental which are ordinarily vertically alined, may be attached to the frame 2 of a window or other foundation. As a matter of fact, there are generally two of these standards or uprights 2, combined together.

From the vertically disposed standard or upright there extend one or more arms 5 which as shown are practically horizontally disposed and which are usually integral or made otherwise rigid with the standard. Although there are three of such rigid arms 5, the number may be either increased or decreased as desired. As shown, the horizontally disposed rigid arms 5 terminate at their outer ends in upright studs or pivots 6, the reduced upper ends of which extend pivotally through the central portion of one or more rods as 7. As shown, there are three of such rods 7. These rods 7 as represented terminate at their opposite ends in upstanding pivots 8 which are intended to extend into the central portion of cups as 9. These cups 9 may contain flower pots (not shown), or the soil of the plants may be put directly into the cups or containers 9. The pivots 8 rest upon the bottoms of the respective cups or containers.

The standard or upright 2 with a similar one or more is pivotally mounted upon a suitable support so that it can swivel. The rods 7 are also pivotally mounted as are the cups 9 combined with them so that the various elements can be brought to different angles with each other as shown for instance in Figs. 2 and 3. The flower growths may be twined about the structure in any manner that may be desired.

I desire to call attention to the fact that the cups 9 are adapted to turn through a complete circle which is particularly advantageous when they contain growing plants, as by turning them, the plants therein can be subjected properly to the sun's rays being turned through a complete circle to insure this action.

What I claim is:

1. A device of the class described comprising a standard, means by which said standard is pivotally mounted, a plurality of arms rigid with and extending from the standard, the arms being provided at their ends with upstanding pivots, rods through the centers of which the pivots extend, and on which they turn, the rods having pivots at their ends, and cups receiving the last mentioned pivots, for rotation each through a complete circle.

2. A device of the class described, comprising a standard, a bearing, and a crown-piece, adapted for attachment to a window frame and which jointly pivotally support the standard, a plurality of horizontal arms rigid with and extending from the standard, the arms being provided at their ends with upstanding pivots, horizontal rods through the centers of which the pivots extend and on which said rods turn, the rods having pivots at their ends, and cups receiving the last mentioned pivots for rotation, the bottoms of the cups being imperforate through a complete circle.

In testimony whereof, I hereby affix my signature.

EVA M. LENNOX.

Witnesses:
WILLIAM A. LENNOX,
ARLINE M. BARUCH.